United States Patent [19]

Pringle

[11] Patent Number: 4,779,441

[45] Date of Patent: Oct. 25, 1988

[54] TUBE HAVING A FLARED END

[76] Inventor: William L. Pringle, 999 Lake Shore Rd., Grosse Pointe Shores, Mich. 48236

[21] Appl. No.: 485,332

[22] Filed: Apr. 15, 1983

[51] Int. Cl.[4] .......................................... B21D 41/02
[52] U.S. Cl. ...................................... 72/316; 72/317; 72/370
[58] Field of Search ................. 72/316–318, 72/115–117, 370, 414; 29/157 R; 7/157

[56] References Cited

U.S. PATENT DOCUMENTS

| | | | |
|---|---|---|---|
| 1,505,409 | 8/1924 | Mueller et al. | 72/318 |
| 2,242,831 | 5/1941 | McIntosh | 72/317 |
| 2,302,794 | 11/1942 | Neukirch | 72/317 |
| 2,442,224 | 5/1948 | Vaill | 72/317 |
| 2,774,408 | 12/1956 | Franck | 72/317 |
| 3,052,279 | 9/1962 | Collin et al. | 72/317 |
| 3,411,338 | 11/1968 | Carlin | 72/316 |
| 3,849,881 | 11/1974 | Strybel | 72/316 |
| 3,913,364 | 10/1975 | Strybel | 72/316 |
| 4,068,515 | 1/1978 | Kowal et al. | 72/318 |

FOREIGN PATENT DOCUMENTS

| | | | |
|---|---|---|---|
| 607959 | 11/1960 | Canada | 72/116 |
| 1207464 | 10/1970 | United Kingdom | 72/318 |

Primary Examiner—Daniel C. Crane
Attorney, Agent, or Firm—Reising, Ethington, Barnard, Perry & Milton

[57] ABSTRACT

An apparatus (10) for flaring an end portion (14) of a deformable tube (16), the end portion (14) having an annular burr (18) extending into the tube (16), the apparatus including a conical projection (20) for flaring the end portion (14) of the tube (16) when the tube (16) is forced thereon and characterized by the conical projection being of a predetermined radius and having a predetermined slope for engaging the burr (18) as the end portion (14) of the tube (16) is forced onto the conical projection (20) to force the burr (18) into the inner surface of the flared end portion (14). A method of flaring the end portion (14) is provided and includes the steps of flaring the end portion (14) and forcing the burr (18) into the inner surface of the flared end portion (14) to form a flared end portion (14) having a rounded edge and a substantially uniform wall thickness.

5 Claims, 2 Drawing Sheets

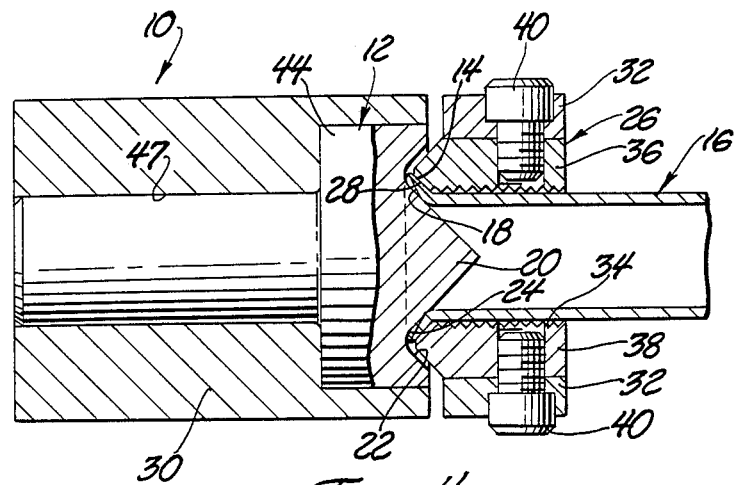
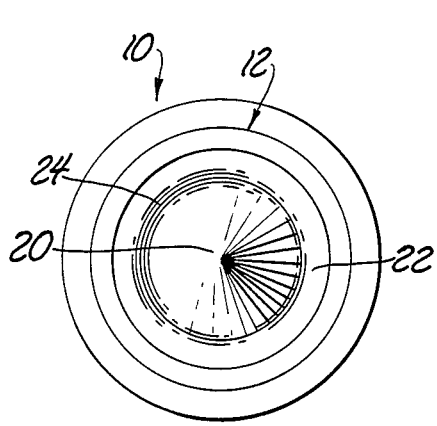
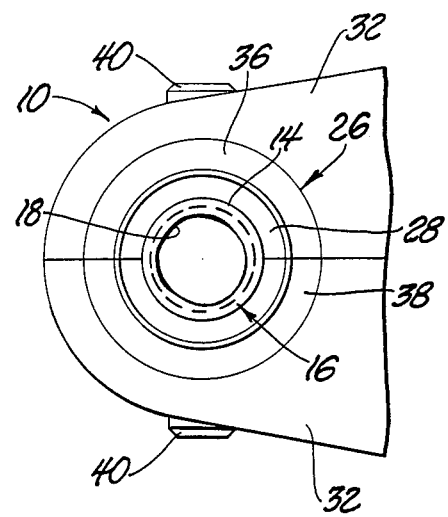
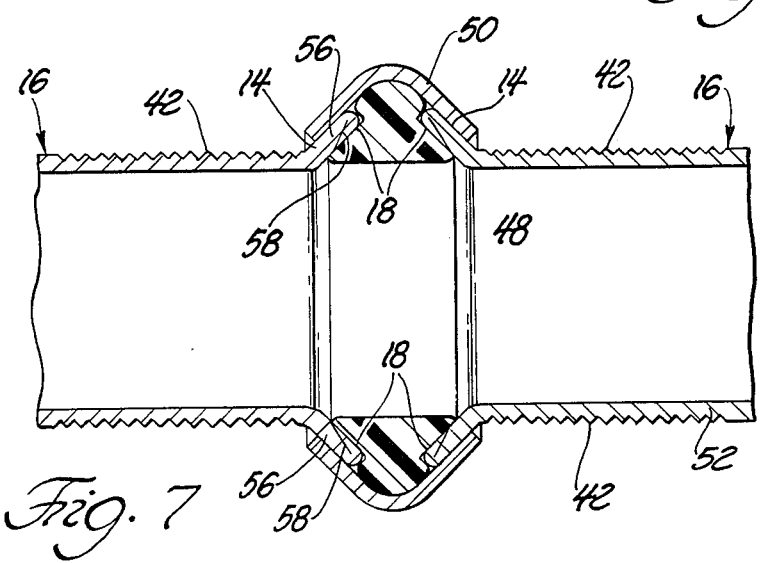

TUBE HAVING A FLARED END

TECHNICAL FIELD

This invention relates to a method and apparatus for forming a tube having a flared end portion and to a tube formed by the same.

BACKGROUND ART

When deformable tubing, such as copper tubing, is new or is in use and is in disrepair, it is often necessary to cut the tubing and to form a joint at the cut end. The cut end is flared and then joined by one of various joint forming means to a flared end of a second tube to form the joint. An example of such a joint and method of forming the same is disclosed in the copending patent application Ser. No. 363,958, filed Mar. 31, 1982 in the name of applicant. Generally, a gasket is disposed between the flared ends of the tube to perfect a seal therebetween. It is necessary that the edges of the flared ends of the tubes not cut the gasket. Many prior art methods of flaring tubes include the steps of forcing an end of a tube onto a cone-shaped member causing a great reduction in the wall thickness of the flared end portion. The U.S. Pat. Nos. 3,849,881 and 3,913,364 to Strybel teach such an assembly. The result is a sharp edge at the end of the flared end portion that would cut the gasket. Alternatively, many methods have been devised for forming double walled flares. An example of such a method is disclosed in U.S. Pat. No. Re. 30,940 to Cowal et al. An end of a deformable tube is forced into a device which buckles the end portion into the tube as the end portion is flared outwardly. This method of flaring a tube has been found to be quite expensive and time-consuming. Further, once a tube is cut, a burr is formed about the inner circumference of the edge of the tube. Prior art methods have required that the burr be ground or sanded from the tube to form a smooth inner surface prior to the flaring operation.

The instant invention provides an apparatus and method for forming a novel tube having a rounded edge which will not cut the gasket and does not require the removal of the burr formed during the cutting of the tube.

STATEMENT OF INVENTION

According to the present invention, there is provided a method of flaring an end portion of an deformable tube, the end portion having an annular burr extending into the tube, the method including the steps of flaring the end portion of the tube and forcing the burr into the inner surface of the flared end portion to form a flared end portion having a rounded edge and a substantially uniform wall thickness.

The instant invention further provides an apparatus for forming the flared end portion of the tube, the apparatus including flaring means for flaring the end portion of the tube when the tube is forced thereon and characterized by the flaring means including engagement means for engaging the burr as the end portion of the tube is forced into the flaring means to force the burr into the inner circumference of the flared end portion.

The instant invention further provides a metallic tube including a body portion and an outwardly flared end portion characterized by having a rounded edge portion and a substantially uniform wall thickness.

FIGURES IN THE DRAWINGS

Other advantages of the present invention will be readily appreciated as the same becomes better understood by reference to the following detailed description when considered in connection with the accompanying drawings wherein:

FIG. 4 is a cross-sectional view partially broken away and in cross section of the subject apparatus and a cross-sectional view of a tube having a flared end portion formed in accordance with the instant invention;

FIG. 5 is an end view taken substantially along lines 5—5 of FIG. 2;

FIG. 6 is a fragmentary end view taken substantially along lines 6—6 of FIG. 2; and FIG. 7 is a cross-sectional view of two tubes joined at a joint, the tubes being constructed in accordance with the instant invention.

DETAILED DESCRIPTION OF THE DRAWINGS

Figure 1:
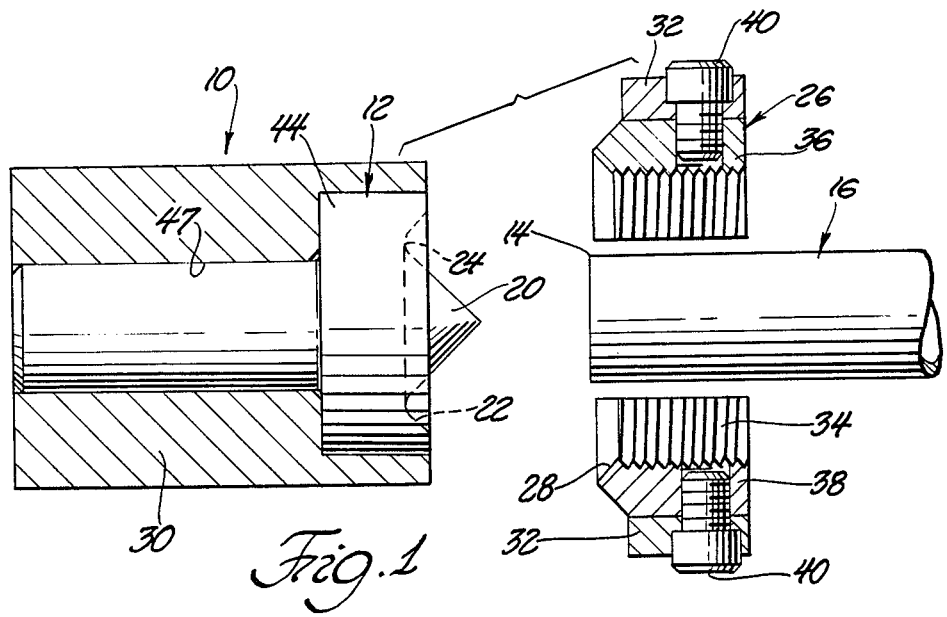
FIG. 1 is a cross-sectional view of an apparatus constructed in accordance with the instant invention showing a cut tube disposed between the opened gripping means of the apparatus.

An apparatus for flaring an end portion of a tube constructed in accordance with the instant invention is generally shown at 10 in FIGS. 1-6.

The apparatus 10 includes flaring means generally indicated at 12 for flaring the end portion 14 of a tube generally indicated at 16. The end portion 14 of the tube has an annular burr 18 extending into the tube 16. The burr 18 is formed during the cutting of the tube 16 from either new stock or in the field during the repairing of a worn or otherwise unuseable tube. The cutting of the tube resulting in the radially inwardly extending burr is well known in the art.

The apparatus 10 is characterized by including engagement means for engaging the burr 18 as the end portion 14 of the tube 16 is forced onto the flaring means 12 to force the burr 18 into the inner surface of the flared end portion 14. That is, the flaring means 12 of the instant invention includes means for engaging the burr 18 on the end portion 14 of the tube 16 so as to grab the burr 18 as the end portion 14 of the tube 16 is flared so as to cold-form or extrude the burr 18 along the inner surface of the end portion 14 of the tube 16 as it is flared to form a flared end portion 14 having a rounded edge and a substantially uniform wall thickness. That is, the burr is moved back into and along the corner surface or circumference of the interior of the flare while forming the rounded edge.

More specifically, the flaring means 12 includes a conical projection 20 whereby the burr 18 of the tube 16 engages the conical projection 20 as the tube 16 is forced thereover. The conical projection has a predetermined radius at the base thereof and angle of slope so as to provide the engagement means for engaging the burr 18 while further allowing the end portion 14 to be flared thereover. In other words, the slope of the cone 20 must be sufficiently steep so as to engage the burr 18 and flare the end portion 14 of the tube 16 as the tube 16 is forced thereover while not causing the end portion 14 of the tube 16 to fracture during the process.

The flaring means 12 further includes an annular outwardly flared portion 22 disposed about the conical portion 20 forming an annular valley 24 therebetween having a rounded bottom. The rounded bottom of the valley 24 provides a rounded surface against which the edge of the end portion 14 of the tube 16 is forced against so as to form the rounded edge of the flared end portion 14. The edge of the flared end portion 14 must be rounded so as to not cut the joint gasket as discussed above.

Figure 2:
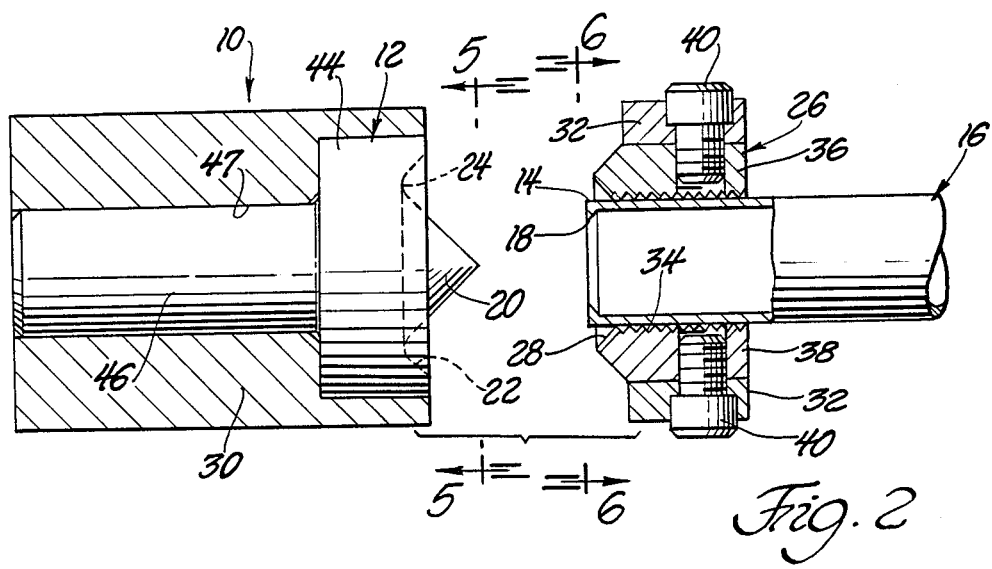
FIG. 2 is a cross-sectional view of the apparatus wherein the gripping means engages the cut tube, the cut tube being shown partially broken away and in cross section.
Figure 3:
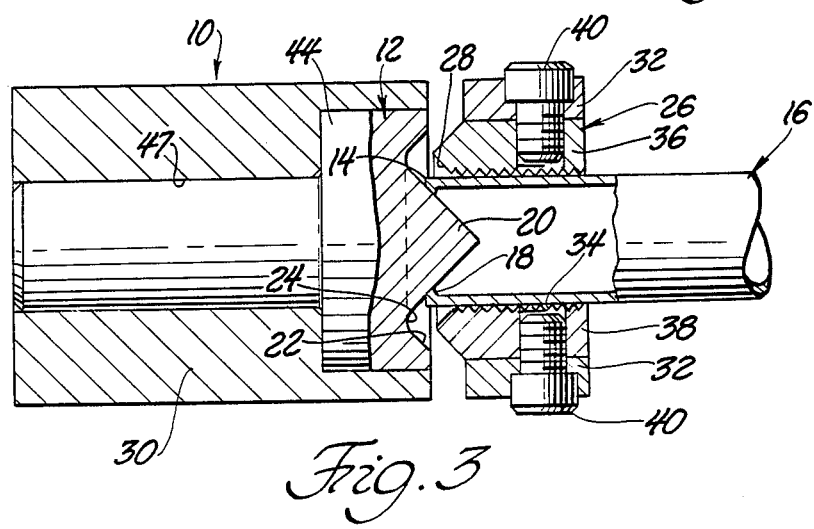
FIG. 3 is a cross-sectional view partially broken away of the subject apparatus wherein the cut tube engages the engagement means of the instant invention, the cut tube being shown partially broken away and in cross section.

The apparatus 10 includes gripping means generally indicated at 26 having a front end face 28 for gripping the tube 16 so that the end portion 14 of the tube 16 extends beyond the front end face 28, as shown in FIGS. 2 and 3. The apparatus further includes clamping means for clamping the gripping means 26 against the flaring means 12 to force the end portion 14 of the tube 16 over the conical portion 20 of the flaring means 12. The clamping means may take the form of a first jaw 30 and a second separable jaw 32 of a joint-forming apparatus such as that disclosed in the copending application Ser. No. 363,958 to applicant.

The front face 28 of the gripping means 26 is an outwardly flared surface. In operation, the end portion 14 of the tube 16 is clamped between the outwardly flared surface of the front face 28 and the conical portion 20 as shown in FIG. 4. The gripping means 26 further includes a threaded inner surface 34 for gripping into the tube 16 to retain the tube 16 within the gripping means 26. In the preferred embodiment, the gripping means includes first and second halves 36 and 38 which mate together to define a passageway therethrough, the threaded inner surface 34 being disposed about the passageway for gripping the tube 16 within the passageway. The first and second halves 36 and 38 of the gripping means are inserts which are secured within the jaws 32 by set screws 40. Thusly, the insert halves 36 and 38 are retained within pockets of the jaws 32 of the joint forming apparatus for seating the insert halves 36 and 38 therein. The jaws 32 have an open condition separating the insert halves 36 and 38 for allowing for the insertion of the tube 16 therebetween, as shown in FIG. 1. The jaws 32 further have a closed position for clamping the threaded inner surface 34 of the insert halves, 36, 38 into the tube 16 as shown in FIGS. 2 through 4 and 6. The threaded inner surface 34 forms grooves 42 in the outer surface of the tubes, as shown in FIG. 7.

The preferred embodiment of the instant invention includes a third insert having a head portion 44, the head portion 44 including the flaring means 12 and a neck portion 46. The insert is supported within a pocket 47 of the jaw 30.

The instant invention provides a method of flaring the end portion 14 of the deformable tube 16, the method including the steps of flaring the end portion 14 of the tube 16 and forcing the burr 18 into the inner surface of the flared end portion 14 to round off the edge of the flared end portion 14. That is, the end portion 14 is forced onto the conical portion 20 to a sufficient extent to force a portion of the burr 18 extending inwardly from the end portion 14 to be cold-formed or extruded into the inner surface of the flared end portion 14 and along the rounded bottom portion 24 of the flaring means 12 to form the rounded off edge of the flared end portion 14. In other words, as the end portion 14 of the tube 16 is forced onto the conical portion 20, the burr 18 engages the conical portion 20 and is cold-formed along the inner surface of the end portion 14, as the end portion 14 is flared between the remainder of the conical portion 20 and the outwardly flared front face portion 28 of the gripping means 26. The tube 16 is forced onto the conical portion 20 to a sufficient extent so as to cause material at the edge of the end portion 14 to be forced into the inner surface of the flared end portion 14 and formed against the curved valley 24 of the flaring means thereby forming the rounded edge of the flared end portion 14.

The method further includes the steps of inserting the conical portion 20 into the end portion 14 of the tube 16 to engage the burr 18 and forcing the conical projection 20 into the end portion 14 to flare the end portion 14 about the conical portion 20 while forcing the burr 18 into the inner surface of the flared end portion 14. The tube 16 is gripped by the insert halves 36 and 38 having the outwardly tapering end face 28 so that the end portion 14 of the tube 16 extends beyond the end face 28. The end portion 14 of the tube 16 is clamped between the conical portion and the end face 28 to force the end portion 14 of the tube 16 onto the conical portion 20. The step of gripping the tube 16 may be accomplished by clamping the tube 16 within the passageway between the insert halves 36 and 38 of the gripping means 26.

In operation, the tube 16 is inserted between the insert halves 36 and 38 of the gripping means 26. As shown in FIG. 2, the clamping means are closed so as to clamp the threaded inner surface 34 of the gripping means 26 against the tube 16 so as to allow the end portion 14 of the tube 16 to be disposed between the outwardly flared front face 28 of the insert halves 36 and 38. As shown in FIG. 3, the flaring means 12 is forced into the tube 16 so that the burr 18 engages the conical projection 20. As shown in FIG. 4, the end portion 14 of the tube 16 is flared over the conical projection 20 as the burr 18 is cold-formed or extruded along the inner surface of the flared end portion 14.

A joint made from tubes constructed in accordance with the instant invention is shown in FIG. 7. The joint includes two tubes 16 having flared end portions 14 engaging a gasket 48, the tubes 16 being joined by connecting ferrule 50. Each tube 16 includes a body portion 52 which is substantially cylindrical, and an outwardly flared end portion 14 and is characterized by including a single wall 14 having a rounded edge portion and a substantially uniform wall thickness. Therefore, unlike prior art tubes having flared end portions which include either a double layered wall or a flared end having a tapering wall thickness, the instant invention includes a flared end portion having a rounded edge and a uniform wall thickness.

The flared end portion 14 includes an outer tapered portion 56 integral with the body portion 52 and a tapered inner portion 58 integral with the outer portion 56 and folded over against the outer portion 56, the inner and outer portions tapering in opposite directions to form the uniform wall thickness of the flared end portion 14. During the extrusion of the burr 18 along the inner surface of the end portion 4 of the tube 16, the end portion 14 forms the tapered outer portion 56 of the wall which tapers away from the body portion 52 and the burr 18 forms the inner portion 58 of the wall. The inner and outer walls 56 and 58 are folded at the rounded edge of the flared end portion 14 and taper in opposite directions so as to form a single flared end portion wall 14 having a uniform wall thickness.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A method of flaring an end portion (14) of a deformable tube (16), including an annular tube wall, the end portion (14) having an annular burr (18) of lesser thickness than the tube wall extending into the tube (16), said method comprising the steps of: flaring the end portion (14) of the tube (16) and cold forming at least a portion of the end portion (14) into the inner surface of the flared end portion (14) by engaging the burr with a flaring tool to form a flared end portion (14) having a substantially uniform wall thickness and to round off the edge of the flared end portion (14).

2. A method as set forth in claim 1 further including the steps of inserting a conical projection (20) into the end portion (14) of the tube (16) to engage the burr (18) and forcing the conical projection (20) into the end portion (14) to flare the end portion (14) about the conical portion (20) while forcing the burr (18) into the inner surface of the flared end portion (14).

3. A method as set forth in claim 2 further including the steps of gripping the tube (16) with a gripping member (36, 38), having an outwardly tapering end face (28) so that the end portion (14) of the tube (16) extends beyond the end face (28) and clamping the end portion (14) of the tube (16) between the conical portion (20) and the end face (28) to force the end portion (14) of the tube (16) onto the conical portion.

4. A method as set forth in claim 3 wherein the gripping member includes a first and second half which mate together to form a passageway therethrough, said step of gripping the tube (16) further defined as clamping the tube (16) within the passageway between the first and second halves (36, 38) of the gripping member (26).

5. A method as set forth in claim 1 further including cutting a tube (16) to form an end portion (14) having the burr (18).

* * * * *